United States Patent [19]
Ehrig et al.

[11] 3,721,648
[45] March 20, 1973

[54] RADIATION-CROSSLINKABLE POLYMERS PREPARED FROM OLEFINICALLY UNSATURATED MONOMERS AND VINYLENE CARBONYL MONOMERS

[75] Inventors: Bodo Ehrig; Erwin Muller; Ludwig Mott, all of Leverkusen, Germany

[73] Assignee: Bayer Aktiengesellschaft, Leverkusen, Germany

[22] Filed: March 16, 1971

[21] Appl. No.: 124,948

[30] Foreign Application Priority Data

March 20, 1970 Germany.....................P 20 13 414.9

[52] U.S. Cl. ........260/47 UA, 117/124 E, 117/132 R, 117/142, 117/148, 117/155 UA, 117/161 UZ, 260/29.6 R, 260/31.4 R, 260/33.4 PQ, 260/33.6 UA, 260/62.63 R, 204/159.22

[51] Int. Cl..........................C08g 33/10, C08g 15/00
[58] Field of Search............260/47 UA, 63 R, 63 UY

[56] References Cited

UNITED STATES PATENTS 3,214,492   10/1965   Tocker...............................260/63 X
3,257,202   6/1966   Schlesinger et al..................260/63 X

*Primary Examiner*—Howard E. Schain
*Attorney*—Conolly and Hutz

[57] ABSTRACT

Polymers and Copolymers of olefinically unsaturated monomers with radiation-crosslinkable vinylene carbonyl groups (—CH=CH—CO—) or vinylene carbonyl vinylene groups (—CH=CH—CO—CH=CH—) are obtained by radicalic polymerization in heterogeneous phase at a temperature between about 0°–150° C.

6 Claims, No Drawings

RADIATION-CROSSLINKABLE POLYMERS PREPARED FROM OLEFINICALLY UNSATURATED MONOMERS AND VINYLENE CARBONYL MONOMERS

This invention relates to radiation-crosslinkable polymers and to a process for the production thereof.

It is known that radiation-crosslinkable polymers can be obtained by polymerizing olefinically unsaturated monomers containing an isocyanate group, either on their own or together with other copolymerizable monomers, in the presence of compounds which form free radicals, in such a way that the isocyanate group is left intact, and converting the resulting polymers into radiation-crosslinkable substances by a polyaddition reaction of the isocyanate groups, for example with p-hydroxy chalkone (cf. German Patent Specification No. 1,067,219).

It is also known that glycidyl ethers of phenols containing light-sensitive groups, such as vinylene carbonyl groups, for example the glycidyl ether of 4-hydroxychalkone, can be polymerized by way of the epoxy group in organic solvents by means of ionic catalysts, and the polymers obtained can be crosslinked by ultra-violet radiation (cf. French Patent Specification Nos. 1,508,445 and 1,508,447).

The object of the present invention was to provide radiation-crosslinkable homopolymers and copolymers of olefinically unsaturated monomers with radiation-crosslinkable vinylene carbonyl groups (—CH=CH—CO—) or vinylene carbonyl vinylene groups (—CH=CH—CO—CH=CH—), and a process for the preparation thereof.

According to the invention, this object was achieved by subjecting monomers containing (meth)acryloyloxy groups and radiation-crosslinkable vinylene carbonyl or vinylene carbonyl vinylene groups to radical polymerization in heterogeneous phase together with other radically copolymerizable monomers in such a way that the radiation-crosslinkable groups are left intact.

Accordingly, the present invention relates to a process for the production of radiation-crosslinkable polymers in which an olefinically unsaturated monomer having an acryloyloxy or methacrylayloxy radical bound, either directly or indirectly through an alkyleneoxy radical with at least two carbon atoms optionally interrupted by one or more oxygen atoms, to a benzene nucleus which is optionally substituted by halogen or alkyl, aryl or alkoxy groups and which contains an alkoxy-carbonyl vinylene group (—CH=CH—CO—OR) or which is attached through a vinylene carbonyl (—CH=CH—CO—), a carbonyl vinylene (—CO—CH=CH—) or vinylene carbonyl vinylene radical (—CH=CH—CO—CH=CH—) to a benzene or naphthalene nucleus optionally substituted by halogen atoms, or alkyl, aryl or alkoxy groups, is polymerized in heterogeneous phase with at least one additional copolymerizable monomer.

Monomers suitable for use in accordance with the invention correspond, for example to the formula $$R — (CH=CH)_x — CO — CH=CH — R' \quad (I)$$

in which R represents a group of the formula

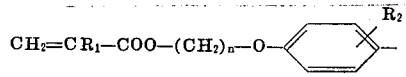

or

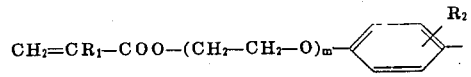

or, when $x$ represents O, R and R' may be exchanged, $R_1$ represents hydrogen or methyl,
$R_2$ represents hydrogen, halogen (preferably chlorine), alkyl with one to four carbon atoms, aryl with six to 10 carbon atoms, or alkoxy with one to four carbon atoms,
$n$ has a value from 2 to 20,
$m$ has a value from 0 to 20,
$x$ represents 0 or 1, and
$R'$ represents a group of the formula

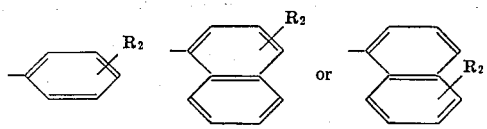

The monomers used in accordance with the invention preferably correspond to formula II $$R — CO — CH=CH — R' \quad (II)$$

in which
R and R' are exchangeable and
R represents a group of the formula

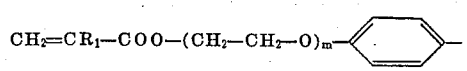

in which
$R_1$ represents hydrogen or methyl,
$m$ represents 0 or 1, and $R'$ represents a group of the formula 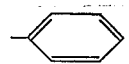

The monomers used in accordance with the invention can be prepared by known methods. For this purpose, an optionally nucleus-substituted monohydroxychalkone or monohydroxydibenzyl acetone compound, or a monohydroxy compound obtained from an optionally substituted naphthanlene-1-aldehyde or naphthalene-1-methyl ketone with an optionally substituted p-hydroxy-acetophenone or p-hyrooxybenzaldehyde, in solution in a suitable organic solvent, for example benzene, toluene, acetone, ethyl methyl ketone or dioxan etc., is treated with an excess, based on acid chloride, of an alkali metal hydrogen carbonate, alkali metal carbonate or alkali metal hydroxide, the reaction mixture is azeotropically dehydrated if an aqueous alkali metal hydroxide or alkali metal carbonate has been added, and acrylic or methacrylic acid chloride is added dropwise, or alternatively is gradually added, in a substantially equimolecular ratio, based on the monohydroxy compound, at a temperature in the range from about 20° to 100°C.. On completion of the reaction, the reaction product is left behind in the form of an oil which, in many instances, crystallizes on prolonged standing.

Hydroxyalkylation products of the abovementioned monohydroxy compounds which are to be reacted with acrylic or methacrylic acid chloride, can be obtained from the monohydroxy compounds, for example p-hydroxyacetophenone, p-hydroxybenzaldehyde, p-hydroxychalkone or p-hydroxydibenzylacetone, with ethylene chlorhydrin or ethylene oxide in aqueous solution in an inert organic solvent or in the melt in the presence of an alkaline catalyst at a temperature in the range from 140° to 160°C.. When hydroxalkylation products of p-hydroxyacetophenone or p-hydroxybenzaldehyde are prepared, they can subsequently be converted into corresponding chalkones or dibenzoylacetones by alkaline condensation with an aldehyde or an acetophenone.

The following monomers may be used as copolymerizable monomers in the process according to the invention:

a. Esters of acrylic acid or methacrylic acid containing one to 18 carbon atoms, preferably one to eight carbon atoms, in the alcohol moiety, for example methyl acrylate, ethyl acrylate, n-butyl acrylate, isobutyl acrylate, tert.-butyl acrylate, 2-ethylhexyl acrylate, methyl methacrylate, ethyl methacrylate, a butyl methacrylate isomer etc., and mixtures thereof:

b. Aromatic vinyl or vinylidene compounds for example styrene, a halogeno styrene, or an alkyl-substituted styrene. The alkyl group of a nuclear-alkylated styrene preferably contains one to four carbon atoms, and an alkyl substituent on the vinyl group pereferably has one to two carbon atoms. The following are specific examples of such compounds: styrene, α-methylstyrene, p-methylstyrene, p-isopropylstyrene and p-chlorostyrene, preferably styrene.

Suitable polymerization catalysts include inorganic peroxidic compounds, such as potassium or ammonium persulphate, hydrogen peroxide and percarbonates; and organirc peroxidic compounds such as acyl peroxides, for example benzoyl peroxide, alkyl hydroperoxides such as tert.-butyl hydroperoxide, cumene hydroperoxide, p-menthane hydroperoxide, dialkyl peroxides such as di-tert.-butyl peroxide, and peroxy esters such as tert.-butyl perbenzoate. The inorganic or organic peroxidic compounds are advantageously used in combination with reducing agents as known per se. Suitable reducing agents include, for example, sodium pyrosulphite or bisulphite, sodium formaldehyde sulphoxylate, triethanolamine, and tetraethylene pentamine.

The quantities in which the catalyst is used are within the limits normally employed in polymerization reactions of this kind, e.g. from 0.01 to 5 percent by weight, based on the total quantity of monomers.

The conventional molecular weight regulators, such as long-chain alkyl mercaptans, diisopropyl xanthogenate, nitro compounds or organic halogen compounds, may be added during the polymerization reaction.

The polymerization temperatures are governed both by the monomers used and also by the activation systems used, and may be preferably in the range from 0° to 150°C, especially in the range from 40° to 90°C.

The copolymerization reaction on which the process according to the invention is based can be carried out either continuously or batchwise in heterogeneous phase by the known methods of emulsion, bead, suspension or precipitation polymerization as described for example in "Methoden der organischen Chemie", Houben-Weyl, Vol. 14/1, 1961, pages 131–503.

The polymerization reaction is preferably carried out in emulsion.

It was surprising that the monomers used in accordance with the invention can be copolymerized smoothly and in high yields in heterogeneous phase, especially in emulsion, because bulk or solution polymerization of the same monomers leads to polymers which are either much more difficult to crosslink or which cannot be crosslinked by radiation.

When polymerization is carried out in emulsion, it is possible either to polymerize all the monomers at once or alternatively to introduce initially only a part of the monomer mixture, and to add the rest after the reaction has started.

Suitable emulsifiers include anionic, cationic and non-ionic emulsifiers, and combinations thereof.

Suitable anionic emulsifiers include higher fatty acids, resin acids, acid fatty alcohol sulphuric acid esters, higher alkyl sulphonates and alkylaryl sulphonates, sulphonated castor oil, sulphosuccinic acid esters or the water-soluble salts of sulphonated ethylene oxide adducts.

Examples of cationic emulsifiers include salts of quaternary ammonium and pyridinium compounds.

Examples of suitable non-ionic emulsifiers include the known reaction products of ethylene oxide with long-chain fatty alcohols or phenols, reaction products of more than 10 mols. of ethylene oxide with 1 mol of fatty alcohol or phenol being particularly suitable.

The aforementioned emulsifiers may be preferably employed in total quantities of from 0.5 to 20 percent by weight, based on the total quantity of monomers, and especially in quantities of from 2 to 10 percent by weight.

The radiation-crosslinkable monomers are preferably used in quantities of from 0.1 to 5 percent by weight, based on the total quantity of monomers. The copolymers obtained in accordance with the invention constitute a valuable radiation-crosslinkable product. The copolymers have average molecular weights of from 15,000 to 100,000 and are soluble in organic solvents such as benzene, toluene, xylene, ethylene glycol monomethyl ether acetate etc. and, when applied to suitable substrates, such as glass, metal, wood, paper or leather, give smooth, coherent, high-gloss elastic films which, after treatment with high-energy rays, show a very high gel content, in other words are crosslinked. THe copolymers according to the invention are preferably obtained in the form of emulsions from which they can, if desired, be isolated as solids by precipitation with electrolytes and/or by low-temperature coagulation or by other suitable methods of isolation.

Radiation-induced crosslinking is carried out most effectively in thin polymer layers, so that the process according to the invention is particularly suitable for the production of high-grade crosslinked lacquer films.

Crosslinking can be induced by high-energy electron rays, γ-rays, X-rays, ultra-violet rays, high-velocity protons, low-velocity and high-velocity neutrons, or α-particles. Ultra-violet rays are particularly suitable.

Before they are applied to suitable substrates for the production of films, the polymers can readily have added to them such additives as stabilizers fillers, pigments, plasticizers, levelling agents and the like.

The parts and percentages quoted in the following Examples are by weight unless otherwise stated.

Preparation of the starting materials
A. 4-methacryloyloxy-chalkone

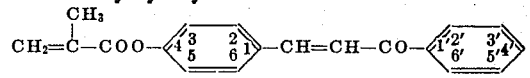

The position references indicated above apply to all the chalkones in the present application.

A mixture of 200 g. of 4-hydroxybenzaldehyde and 200 g. of acetophenone is dissolved in 1,200 cc. of ethanol. Following the addition of a solution of 200 g. of caustic soda and 150 cc. of water, the temperature rises to 60°C.. The reaction mixture is then left standing for 24 hours after which it is stirred into a solution of 1.5 liters of ice water and 500 g. of concentrated hydrochloric acid. The product is filtered under suction and washed with water until neutral. After recrystallization from ethanol, 4-hydroxychalkone melts at 186°C.. The yield comprises 320 g.

224 g. of 4-hydroxychalkone (1mol), m.p. 186°C., are dissolved in 500 cc. of toluene and 112 g. of 50 percent aqueous potassium hydroxide and 0.1 g. of di-tert.-butyl phenol-4-methylene-methyl ether are added to the resulting solution. Approximately 70 cc. of water are azeotropically distilled off from the product. 104.5 g. of methacrylic acid chloride are then added dropwise with thorough stirring at 25° to 40 °C. and the mixture is left standing overnight and then suction-filtered under heat.

The filtrate is concentrated by evaporation in vacuo, giving 231 g. of a viscous oil which crystallizes after prolonged standing. After recrystallization from methanol, 4-methacryloyloxychalkone melts at 93°C..
Analysis: $C_{19}H_{16}O_3$, molecular weight 292.32

| Calculated: | C 78.06% | Found: | C 77.4% |
|---|---|---|---|
| | H 5.52% | | H 5.8% |
| | O 16.42% | | O 16.6% |

4-methacryloylchalkone is referred to as crosslinker I in the following Examples.

B. 4-(methacryloyloxyethoxy)-chalkone $$CH_2=\overset{CH_3}{\underset{|}{C}}-CO-OCH_2-CH_2O-\bigcirc-CH=CH-CO-\bigcirc$$

224 g. of 4-hydroxychalkone (1 mol) are suspened in 300 cc. of water, and 79 g. of 45 percent sodium hydroxide solution are added to the suspension. 82 g. of ethylene chlorohydrin are added dropwise with stirring at 40° to 60°C., followed by heating for 4 hours at 80°C.. The oil precipitated is washed with water and dissolved in 500 cc. of toluene, and the residual water is azeotropically distilled off.

70 g. of anhydrous potassium carbonate is added to the toluene solution of 4-(β-hydroxyethoxy)-chalkone. 104 g. of methacrylic acid chloride (1 mol) are then added dropwise with stirring at 40° to 60°C., stirring is continued for 1 hour at approximately 70°C., the product is suction-filtered under heat and then concentrated by evaporation in a water jet vacuum. A viscous pale yellow oil (4-methacryloyloxyethoxychalkone) is obtained in a yield of 304 g..
Analysis: $C_{21}H_{20}O_4$, molecular weight 336.37

| Calculated: | C 74.98% | Found: | C 75.3% |
|---|---|---|---|
| | H 5.99% | | H 6.1% |
| | O 19.04% | | O 18.5%. |

4-methacryloyloxyethoxychalkone is referred to as crosslinker II in the following Examples.

C. 4'-(methacryloyloxyethoxy)-chalkone

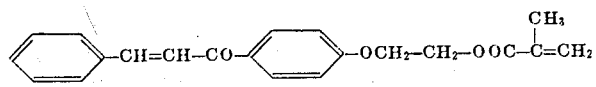

272 g. of 4-hydroxyacetophenone (2mols) are dissolved in 500 cc. of water and 200 g. of 40 percent sodium hydroxide solution. 165 g. of ethylene chlorohydrin (2mols) are then added dropwise with stirring at 40° to 60°C.. The reaction mixture is heated for 4 hours at 80°C., and the oil precipitated is separated in a separating funnel and distilled. Yield 295 g.. Characteristics of 4-(βhydroxyethoxy)-acetophenone: b.p. 0.05 mm. 173°C., m.p. 66°–68°C..

360 g. of 4-(β-hydroxyethoxy)-acetophenone (2 mols) are dissolved in 1 liter of ethyl alchol, 212 g. of benzaldehyde are added and the mixture is left standing for 24 hours following the addition of 20 cc. of concentrated caustic soda solution. It is then neutralized with 35 cc, of concentrated hydrochloric acid, concentrated by evaporation in vacuo, and recrystallized from a little methanol. 4'-(β-hydroxyethoxy)-chalkone melting at 76°C. is obtained in a yield of 525 g..

35 g. of potassium carbonate (anhydrous) are added to a solution of 134 g. (0.5 mol) of 4'-β-hydroxyethoxy)-chalkone in 300 cc. of dry toluene. 52 g. of methacryloyl chloride are then added dropwise with stirring at 24° to 40°C., stirring is continued for 1 hour at approximately 70°C., and the reaction mixture is left standing overnight. After filtration, it is concentrated by evaporation in a water-jet vacuum. 129 g. of a yellowish oil, [4'-(methacryloyloxyethoxy)-chalkone], are obtained.
Analysis: $C_{12}H_{20}O_4$ (molecular weight 336.37)

| Calculated: | C 74.98% | Found: | C 74.5% |
|---|---|---|---|
| | H 5.99% | | H 6.1% |
| | O 19.03% | | O 19.3% |

4'-(methacryloyloxyethoxy)-chalkone is referred to in the following Examples as crosslinker III.

D. Comparison test

A mixture of 50 parts by weight of styrene, 45 parts by weight of butyl acrylate and 5 parts by weight of crosslinker III in 100 parts by weight of xylene were copolymerized in the presence of 2.5 parts of tertiary butyl peroctoate. The reaction temperature was 110°C. and the polymerization time 6 hours. A final concentration of 48.4 percent was obtained for a conversion of 96.8 percent.

The micro gel contend was 0 percent. No changes occurred after ultra-violet irradiation.

When the aforementioned reaction mixture was polymerized in bulk, the copolymer obtained did not show any signs of microgel formation after ultra-violet irradiation.

EXAMPLES 1 TO 3

A solution of 250 parts of water and 5 parts of a sodium salt of an alkyl sulphuric acid ester containing 10 to 16 carbon atoms and 2 percent of a monomer mixture as indicated in the following Table, is emulsified in a reaction vessel equipped with stirring mechanism, thermometer, and reflux condenser.

After the temperature has been raised to 75°C., polymerization is activated by the addition of 5.5 parts of a solution of 500 parts of water, 5 parts of potassium peroxydisulphate and 10 parts of a sodium salt of an alkyl sulphuric acid ester with 10 to 16 carbon atoms. The rest of the monomer mixture and the rest of the activator solution are then run in uniformly over a period of 4 hours from two dropping funnels. The polymerization temperature is kept at 75°C.. After stirring for another 4 hours, polymerization is over.

| Example No. | 1 | 2 | 3 | Comparison test |
|---|---|---|---|---|
| butyl acrylate | 59 | 59 | 59 | 60 |
| styrene | 39 | 39 | 39 | 40 |
| crosslinker I | 2 | – | – | – |
| crosslinker II | – | 2 | – | – |
| crosslinker III | – | – | 2 | – |

The polymer was separated from the dispersions obtained and dissolved in benzene. The polymer solutions (40 to 50 percent) were applied to glass plates treated with a release agent (silicone oil) and dried for 12 hours at 25°C. Whereas films based on the polymers of Examples 1 to 3 and the Comparison Test were again soluble in toluene, films based on the polymers of Examples 1 to 3 showed the following results after irradiation for 1 hour with an ultra-violet lamp (Philips HPK 125 W type 57203 B/OO): Films after drying for 1 hour at approximately 25°C..

| Example No. | non-irradiated | gel content after irradiation for 60 minutes with ultra-violet light |
|---|---|---|
| 1 | soluble in toluene | 60.1% |
| 2 | soluble in toluene | 86.7% |
| 3 | soluble in toluene | 75.2% |
| comparison | soluble in toluene | 0 % |

The gel content determined after ultra-violet irradiation is a measure of the degree of crosslinking.

The gel content was determined as follows:

1 g. of a size-reduced film of the irradiated copolymer is tumbled for 24 hours with exactly 100 cc. of toluene in a brown glass-stoppered bottle. The contents of the bottle are then filtered through a cloth filter under a moderate vacuum until the filtrate does not show any further signs of precipitation. The bottle is rinsed out with a few cc. of the solvent and the precipitate is washed out. The washing and rinsing solutions are combined with the main filtrate. Air is drawn through the filtrate until the filter is dry, followed by weighing.

We claim:

1. A process for producing radiation-crosslinkable polymers which comprises polymerizing, in heterogeneous phase,
    A. at least one monomer selected from the group consisting of acrylic and methacrylic acid esters with one to 18 carbon atoms in the alcohol moiety and aromatic vinyl and vinylidene compounds and
    B. a monomer selected from the group consisting of
        a. compounds of the formula
           R—(CH=CH)$_x$—CO—CH=CH—R'
    wherein R is

or
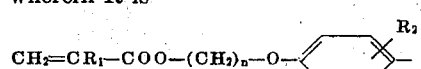

and R' is

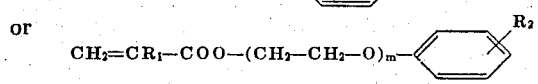, 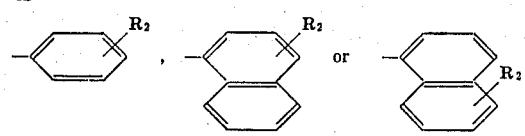

wherein $R_1$ is hydrogen or methyl, $R_2$ is hydrogen, halogen, alkyl having one to four carbon atoms, aryl having six to 10 carbon atoms or alkoxy having one to four carbon atoms, n has a value from two to 20, m has a value from zero to 20 and x has a value of zero or 1 and
    b. the compounds of formula (a) wherein x is zero and the identities of R and R' are interchanged, $R_1$, $R_2$, n and m being as aforesaid.

2. The process of claim 1 wherein (B) is of the formula

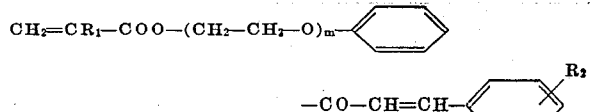

wherein $R_1$ is hydrogen or methyl, $R_2$ is hydrogen, halogen, alkyl having one to four carbon atoms, aryl having six to 10 carbon atoms or alkoxy having one to four carbon atoms and m has a value of zero or 1.

3. The process of claim 1 wherein (B) is of the formula

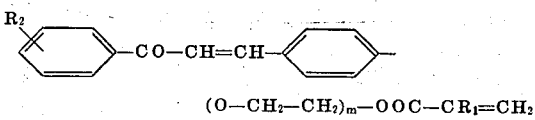

wherein $R_1$ is hydrogen or methyl, $R_2$ is hydrogen, halogen, alkyl having one to four carbon atoms, aryl having six to 10 carbon atoms, or alkoxy having one to four carbon atoms and m has a value of zero or 1.

4. A process as claimed in claim 1 wherein the copolymerizable monomer is at least one monomer from the group consisting of acrylic or methacrylic acid esters with one to 18 carbon atoms in the alcohol moiety, styrene, a nuclear-substituted halogenostyrene, a nuclear-substituted alkyl styrene with one to four carbon atoms in the alkyl group, and a side-chain-substituted alkyl styrenes with one to two carbon atoms in the alkyl group.

5. The product produced by the process of polymerizing in heterogeneous phase,
    A. from 99.9 to 95 percent of at least one monomer selected from the group consisting of acrylic and methacrylic acid esters with one to eight carbon atoms in the alcohol moiety and styrene and
    B. from 0.1 to 5 percent by weight of a monomer of the formula

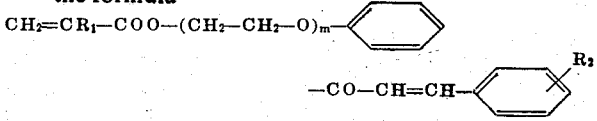

wherein $R_1$ is hydrogen or methyl, $R_2$ is hydrogen, halogen, alkyl having one to four carbon atoms, aryl having six to 10 carbon atoms or alkoxy having one to four carbon atoms and m has a value of zero or 1.

6. The product produced by the process of polymerizing, in heterogeneous phase,
    A. from 99.9 to 95 percent by weight of at least one monomer selected from the group consisting of acrylic and methacrylic acid esters with one to eight carbon atoms in the alcohol moiety and styrene and
    B. from 0.1 to 5 percent by weight of a monomer of the formula

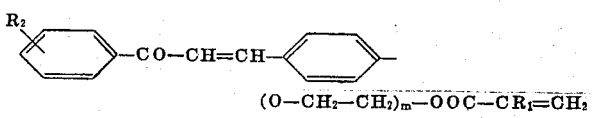

wherein $R_1$ is hydrogen or methyl, $R_2$ is hydrogen, halogen, alkyl having one to four carbon atoms, aryl having six to 10 carbon atoms or alkoxy having one to four carbon atoms and m has a value of zero or 1.

* * * * *